(12) United States Patent
Oh

(10) Patent No.: US 7,173,667 B2
(45) Date of Patent: Feb. 6, 2007

(54) DIGITAL TV RECEIVER FOR PROCESSING TELETEXT INFORMATION

(75) Inventor: Heung Chul Oh, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 443 days.

(21) Appl. No.: 10/843,422

(22) Filed: May 12, 2004

(65) Prior Publication Data

US 2004/0227853 A1    Nov. 18, 2004

(30) Foreign Application Priority Data

May 13, 2003    (KR)    ............... 10-2003-0030160

(51) Int. Cl.
*H04N 11/00* (2006.01)
(52) U.S. Cl. .............. 348/468; 348/461; 348/564; 348/589
(58) Field of Classification Search ........ 348/468, 348/553–555, 563–564, 569, 588, 589, 600, 348/465; *H04N 11/00*
See application file for complete search history.

(56) References Cited

U.S. PATENT DOCUMENTS 5,109,279 A * 4/1992 Ando ............... 348/564
5,610,664 A * 3/1997 Bobert ............. 348/564
5,790,204 A * 8/1998 Yamaguchi ........ 348/564
5,995,160 A * 11/1999 Rumreich ......... 348/564
6,011,594 A * 1/2000 Takashima ........ 348/565
2003/0106056 A1* 6/2003 Naimpally ........ 725/40

* cited by examiner

*Primary Examiner*—Trang U. Tran
(74) *Attorney, Agent, or Firm*—Birch, Stewart, Kolasch and Birch, LLP

(57) ABSTRACT

The present invention includes a teletext decoder extracting to decode the teletext information from an inputted video signal, a video processing unit extracting to process a pure video signal from the inputted video signal only, a teletext bypass unit converting the teletext information extracted from the inputted video signal to an analog video signal form, a first synthesizing unit synthesizing to output the pure video signal outputted from the video processing unit and the teletext information outputted from the teletext decoder, a second synthesizing unit synthesizing to output the pure video signal outputted from the video processing unit and the teletext information outputted from the teletext bypass unit, and a memory storing the processed video signal and the teletext information extracted from the inputted video signal.

17 Claims, 12 Drawing Sheets

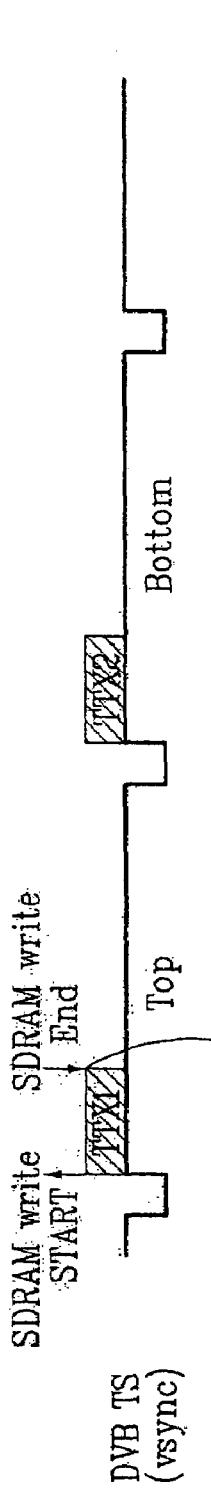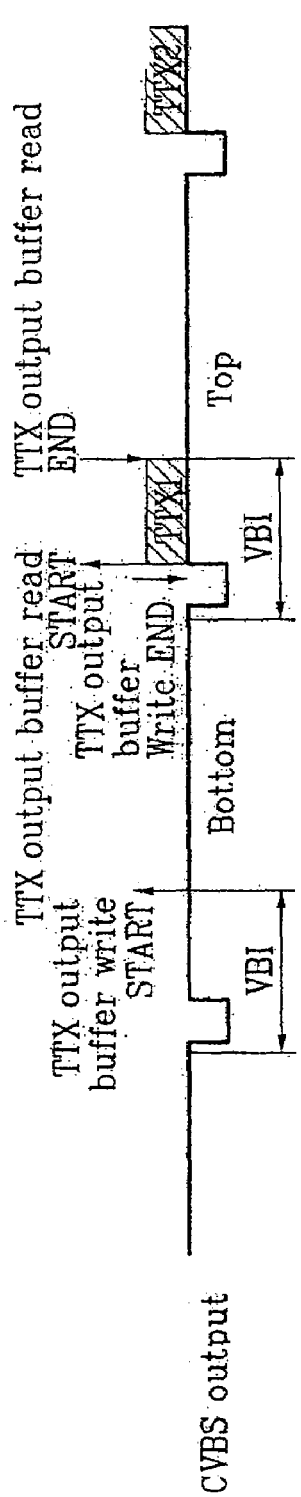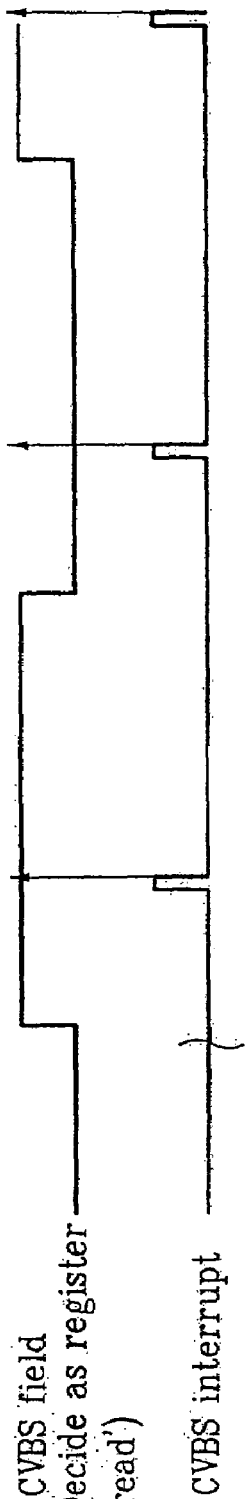
FIG. 8A  DVB TS (vsync)
FIG. 8B  DVD field by S/W
FIG. 8C  CVBS output
FIG. 8D  CVBS field (Decide as register 'read')
FIG. 8E  CVBS interrupt

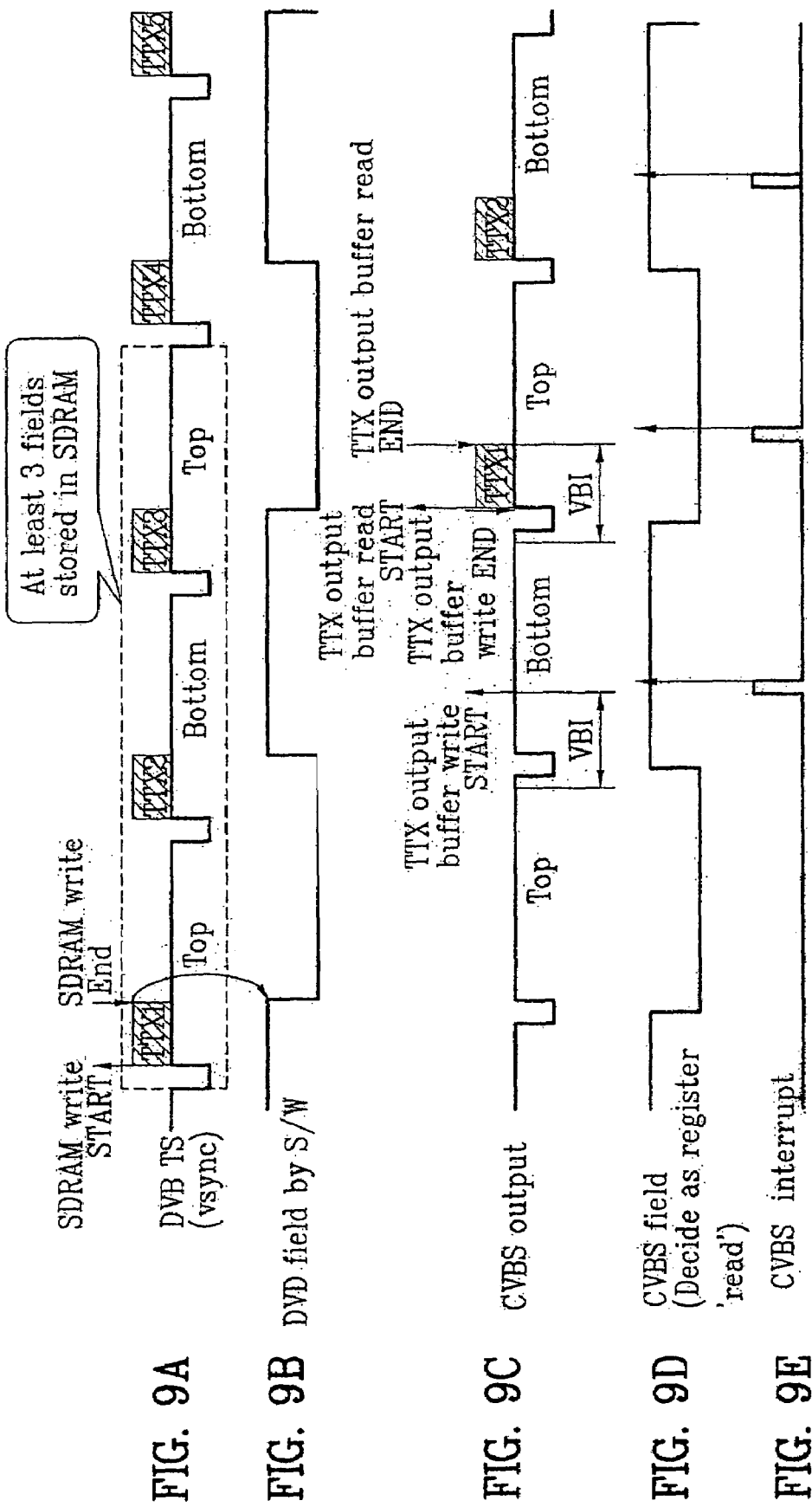

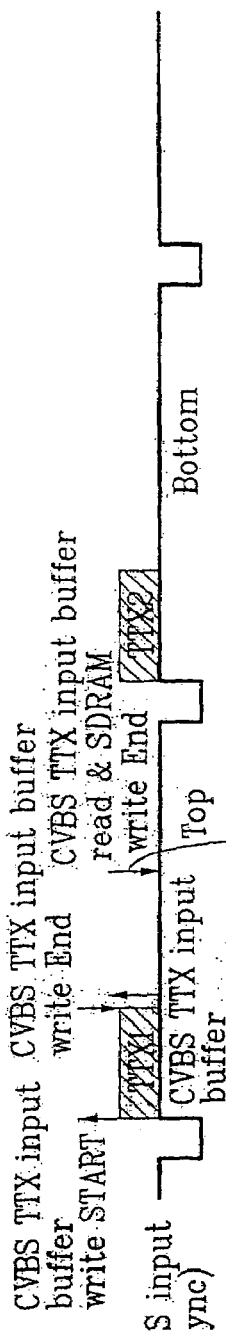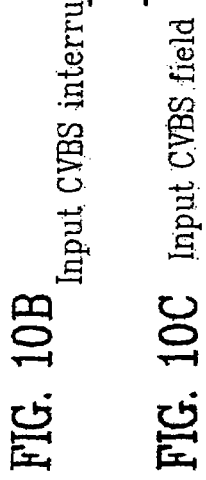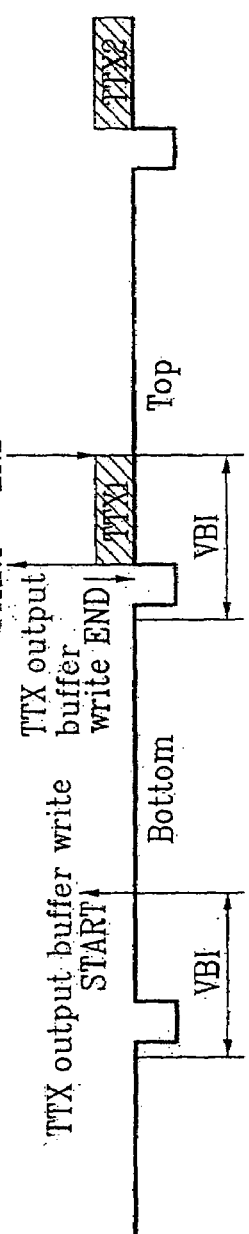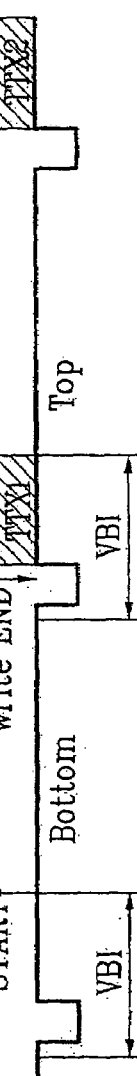
FIG. 10A  CVBS input (vsync)
FIG. 10B  Input CVBS interrupt
FIG. 10C  Input CVBS field
FIG. 10D  CVBS output
FIG. 10E  Output CVBS field (Decide as register 'read')
FIG. 10F  Output CVBS interrupt

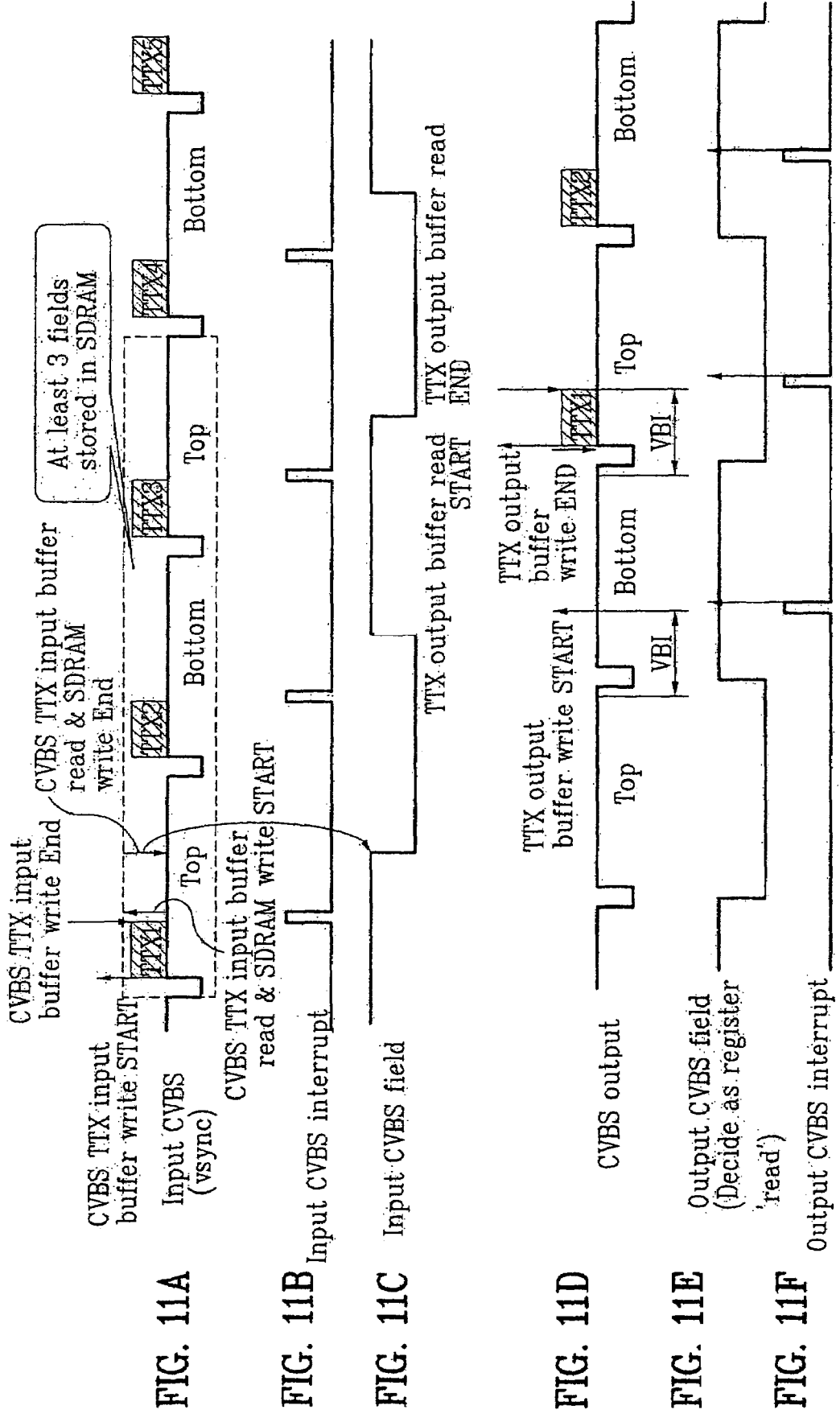

DIGITAL TV RECEIVER FOR PROCESSING TELETEXT INFORMATION

This Non-provisional application claims priority under 35 U.S.C. 119(a) on Patent Application No(s). 10-2003-0030160 filed in Korea on May 13, 2003, the entire contents of which are hereby incorporated by reference.

BACKGROUND OF THE INVENTION

1. Field of the Invention

The present invention relates to a digital TV receiver for processing teletext information, by which a digital TV receives video signals carrying teletext information to display on a screen as intended by a broadcast sender or the teletext information is loaded on an output signal for an external monitor without information loss.

2. Discussion of the Related Art

Lately, previous analog TV receivers are rapidly replaced by digital TV receivers worldwide. In a time of transmission for switching to perfect digital broadcasting, most of the digital TV receivers commercially for sale perfectly support a function of receiving previous analog TV signals as well as digital TV signals. And, the digital TV receiver enables to display the received analog or digital TV signals using a display method of multi-video including main image and sub-image such as PIP, POP, etc, The analog TV having a long history has received various caption broadcast and the like in various ways to display as well as has provided simple video information photographed by a camera to public viewers via a TV receiver. And, one of them is teletext.

Standardization of the teletext exists in the U.S.-centered 525/60 system, i.e., NTSC broadcasting system, but is variously and powerfully used in the European-centered 625/50 system, i.e. PAL broadcasting system.

FIG. 1 is a diagram showing where general video signal, teletext information, and other synchronization signals are located on 625 lines constructing one frame in analog PAL broadcast signal.

Referring to FIG. 1, teletext information exists on 6~22 lines and 319~335 lines.

FIG. 2 shows how the teletext information is loaded on one line where the teletext information can exist concretely. Color burst occurs after initiation of a horizontal synchronization signal. And, information of clock run-in, data and address, and the like follows the color burst according to bit line information value. The information of the clock rub-in, data and address, and the like corresponds to a teletext information value.

FIG. 3 concretely shows what type of waveform the clock run-in forms. Namely, the clock run-in, as shown in FIG. 3 carries data of 2-bytes per 1H, where 'H' is a horizontal interval. The data carries clock data, broadcasting station name (e.g., channel data), broadcast programs for several weeks, and the like.

Namely, the teletext information is carried by the above-explained type. A TV receiver receives an analog PAL signal carrying the teletext information, decodes the teletext information, and then displays it, as shown in FIGS. 4A to 4H, on a monitor of the TV receiver. FIGS. 4A to 4H show examples of displaying data broadcast, train and airplane time schedules, various kinds of caption information, and the like on TV screens by real time, respectively.

Specifically, the analog TV for sale in Europe powerfully has implemented a function of various data broadcasts using teletext information. Hence, the digital TV needs to implement teletext information in the same way of the analog TV. Namely, if an input TV signal carries teletext information, it is necessary to detect the teletext information to provide a corresponding image intended by a broadcast sender on a screen or to make the teletext information bypassed to an output signal for an external monitor without distortion.

SUMMARY OF THE INVENTION

Accordingly, the present invention is directed to a digital TV receiver for processing teletext information that substantially obviates one or more problems due to limitations and disadvantages of the related art.

An object of the present invention is to provide a digital TV receiver for processing teletext information, by which a teletext signal is detected from an inputted digital or analog TV signal to be displayed on a screen in a manner of broadcast sender's intention or by which the teletext information is bypassed to an output signal for an external monitor without distortion.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a digital TV receiver for processing teletext information according to the present invention includes a teletext decoder extracting to decode the teletext information from an inputted video signal, a video processing unit extracting to process a pure video signal from the inputted video signal only, a teletext bypass unit converting the teletext information extracted from the inputted video signal to an analog video signal form, a first synthesizing unit synthesizing to output the pure video signal outputted from the video processing unit and the teletext information outputted from the teletext decoder, a second synthesizing unit synthesizing to output the pure video signal outputted from the video processing unit and the teletext information outputted from the teletext bypass unit, and a memory storing the processed video signal and the teletext information extracted from the inputted video signal.

In this case, the teletext bypass unit includes a decoder extracting the teletext information from an analog video signal stored in the memory, an input buffer temporarily storing the extracted teletext information, a central processor unit storing the teletext information stored in the input buffer in a predetermined area of the memory or reading the teletext information of the analog video signal stored in the memory or the teletext information of a digital video signal stored in the memory, a digital teletext decoding unit extracting the teletext information from the digital video signal stored in the memory to store in a predetermined area of the memory, an output buffer temporarily storing the teletext information read from the memory via the central processor unit, and an encoder encoding to output the teletext information stored in the output buffer into the analog video signal form according to a user's request.

Moreover, the digital TV receiver may further include an analog/digital converting unit converting the inputted analog video signal to a digital signal to store in the memory.

And, the decoder carries out slicing on the teletext information existing in VBI 9vertical blank interval) of the analog video signal to output for the VBI.

Moreover, the digital teletext decoding unit is programmed by software or designed by hardware.

Besides, the memory stores the teletext information of at least three fields.

Meanwhile, the teletext bypass unit includes a decoder extracting the teletext information from an analog video signal stored in the memory, an input buffer temporarily storing the extracted teletext information, a digital teletext decoding unit extracting the teletext information from a digital video signal stored in the memory to temporarily store in a predetermined area of the memory, an output buffer reading to store the teletext information of the analog video signal from the input buffer or reading to store the teletext information of the digital video signal from the memory, and an encoder encoding to output the teletext information stored in the output buffer into the analog video signal form according to a user's request.

In this case, the output buffer stores the teletext information of at least three fields.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 8A to 8E are timing diagrams of teletext information output relation on output CVBS when DVB TS stream as digital TV signal is inputted according to one embodiment of the present invention;

FIGS. 9A to 9E are timing diagrams of teletext information output relation on output CVBS when DVB TS stream as digital TV signal is inputted according to another embodiment of the present invention;

FIGS. 10A to 10F are timing diagrams of teletext information output relation on output CVBS when PAL signal as analog TV signal is inputted according to another embodiment of the present invention; and FIGS. 11A to 11F are timing diagrams of teletext information output relation on output CVBS when PAL signal as analog TV signal is inputted according to another embodiment of the present invention.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
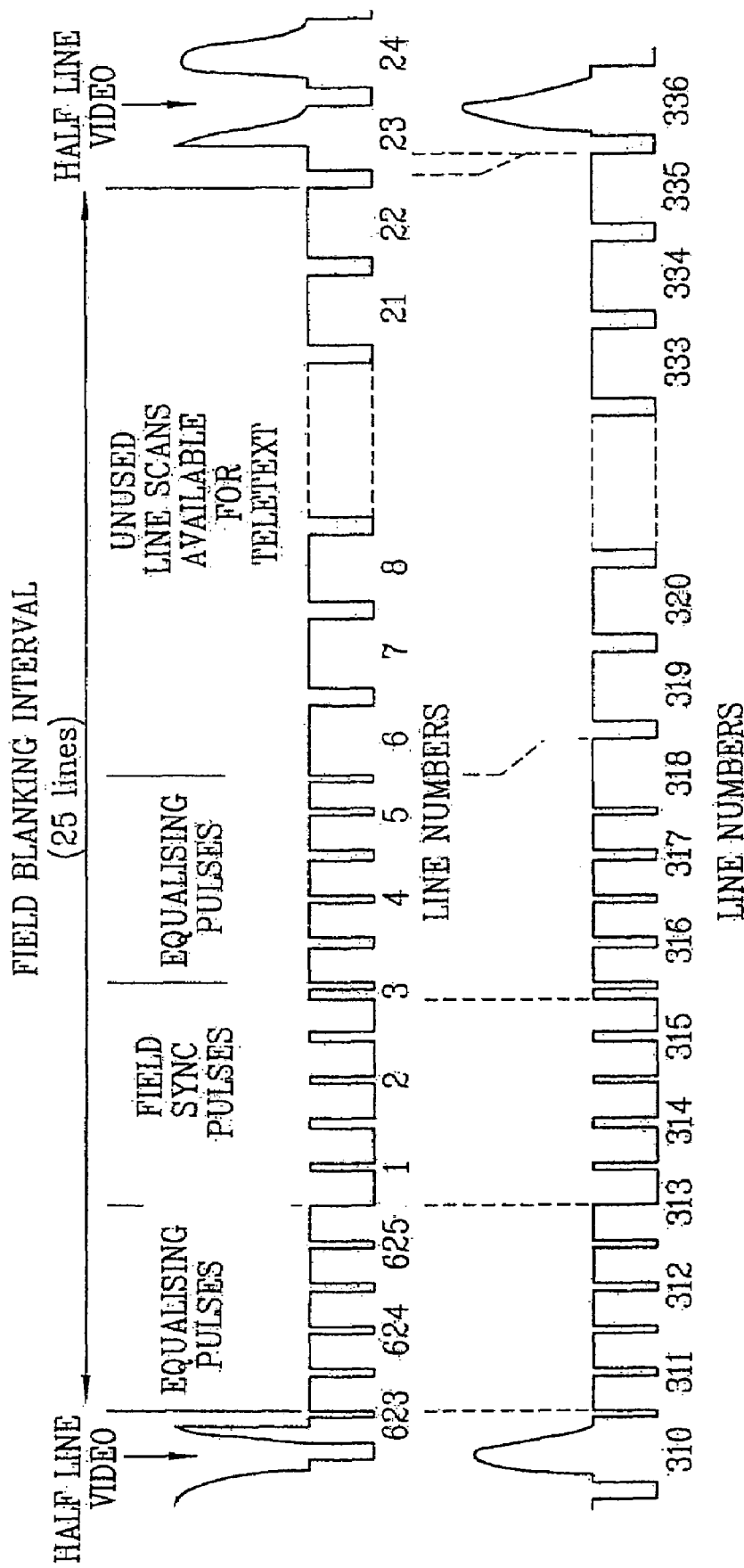
FIG. 1 is a diagram of carrying teletext information in general European analog PAL broadcast.
Figure 2:
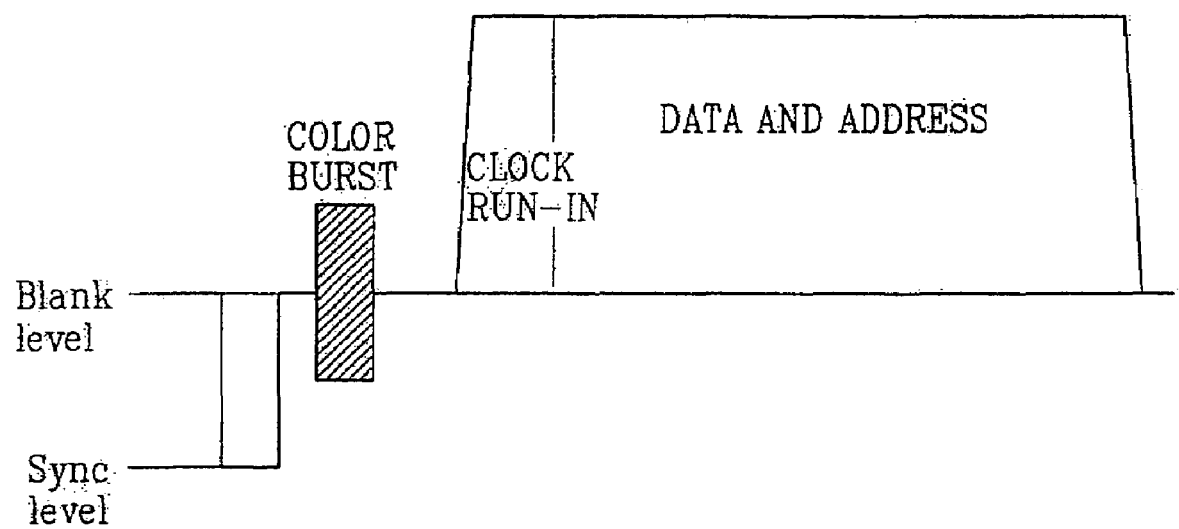
FIG. 2 is a diagram of showing how teletext information is loaded on one line where the teletext information can exist like FIG. 1.
Figure 3:
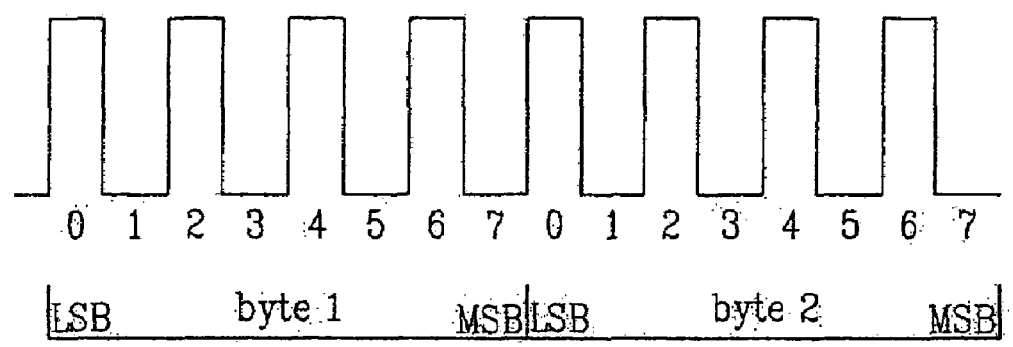
FIG. 3 is a diagram of a waveform of clock run-in of FIG. 2.
Figure 4A:
FIGS. 4A to 4H are diagrams of examples of teletext information displayed on a TV screen.
Figure 4B:
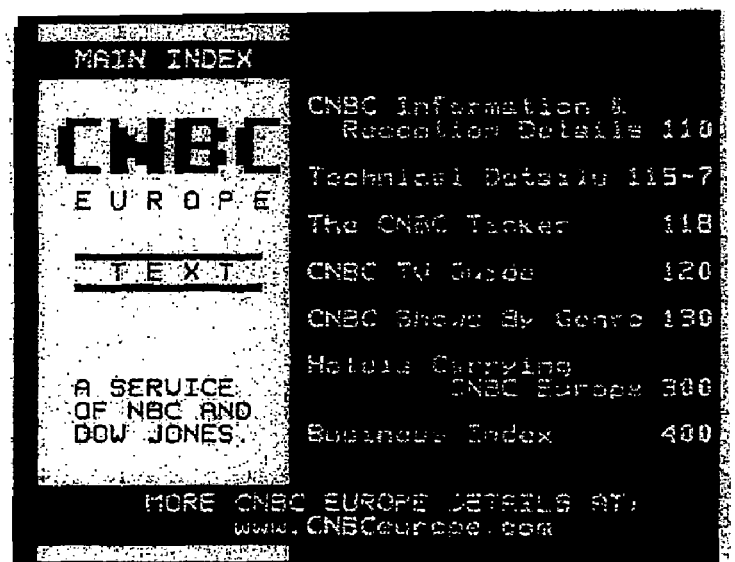
Figure 4C:
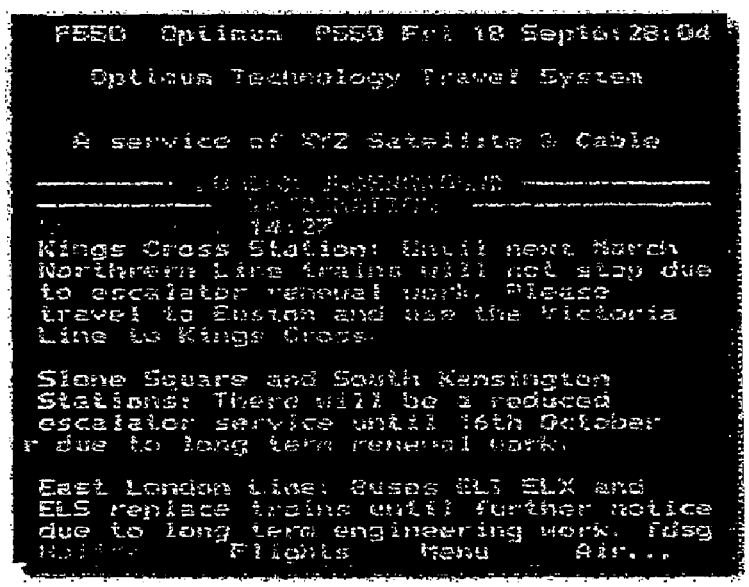
Figure 4D:
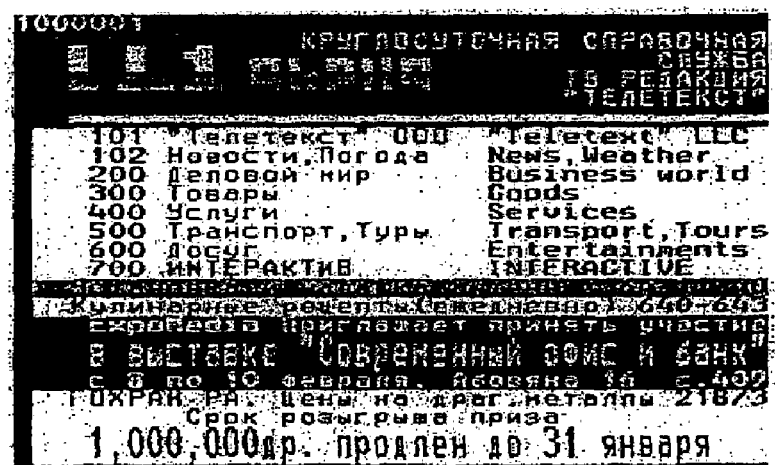
Figure 4E:
Figure 4F:
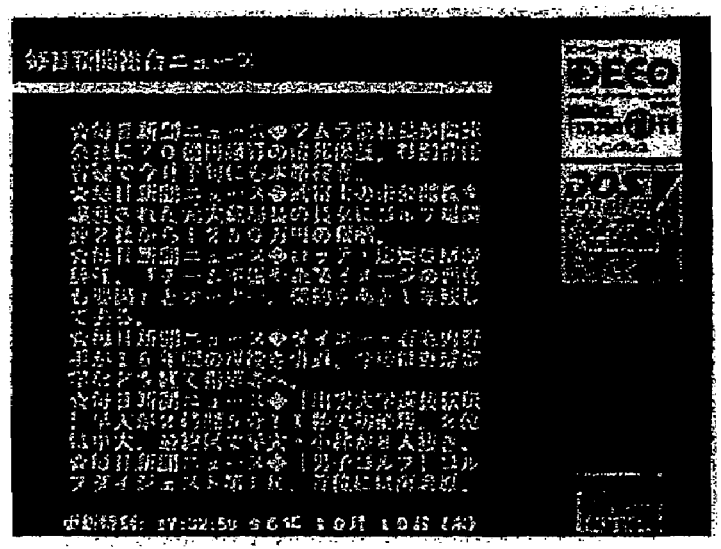
Figures 4G, 4H:
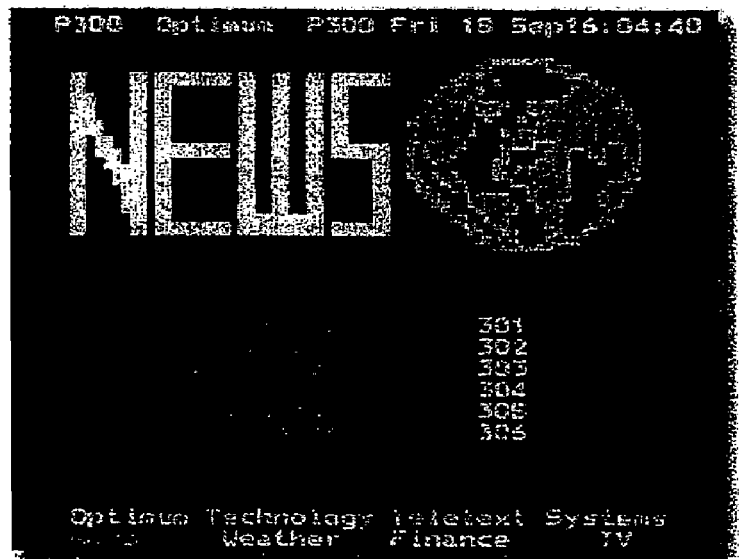
Figure 5:
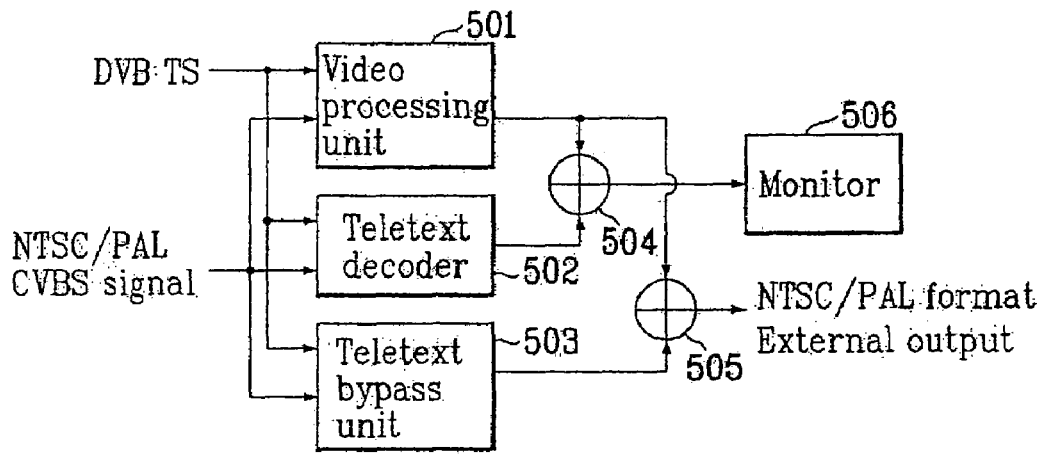
FIG. 5 is a block diagram of a digital TV receiver for processing teletext information according to the present invention.

FIG. 5 is a block diagram of a digital TV receiver for processing teletext information according to the present invention, in which teletext information within an inputted analog video signal (e.g., NTSC or PAL composite video signal) or digital video signal (e.g., U.S.-oriented or Europe-oriented transport stream) is decoded to be displayed on a monitor and in which teletext image identical to that displayed on a monitor for interface with an external recorder is converted to NTSC or PAL format to be externally outputted.

Referring to FIG. 5, a digital TV receiver for processing teletext information according to the present invention includes a video processing unit 501 receiving analog or digital video signal to extract pure video signal only, a teletext decoder 502 detecting teletext information only from the analog or digital video signal and decoding the detected teletext information to fit displaying, a teletext bypass unit 503 extracting the teletext information inserted by a sender side from the analog or digital video signal to convert to NTSC or PAL format, a first adder 504 that is a synthesizing unit synthesizing the pure video signal outputted from the video processing unit 501 with the teletext information decoded by the teletext decoder 502 to output a corresponding synthesized signal to a monitor 506, and a second adder 505 that is another synthesizing unit loading the teletext information outputted from the teletext bypass unit 503 on the pure video signal outputted from the video processing unit 501 to output a corresponding loaded signal to an external device. In this case, the digital TV receiver shown in FIG. 5 can be integrated into one-chip, for which an external system memory that will not be integrated on the one-chip is not shown in the drawing.

In the above-constructed system, the analog or digital video signal is inputted to the video processing unit 501, the teletext decoder 502, and the teletext bypass unit 503. The video processing unit 501 extracts the pure video signal only from the inputted analog or digital video signal, performs signal processing thereon, and then outputs the corresponding processed signal to both of the first and second adders 504 and 505. In case of the digital video signal, the processed signal is stored in an area of an external system memory (not shown in the drawing) allocated for MPEG2 demuxing and then outputted to the first and second adders 504 and 505.

If the inputted analog or digital video signal caries the teletext information, the teletext decoder 502 extracts the teletext information only to fit displaying and then outputs the corresponding decoded signal to the first adder 504. And, the first adder 504 mixes the pure video signal outputted from the video processing unit 501 and the teletext signal decoded and outputted from the teletext decoder 502 with each other to output the corresponding mixed signal to the monitor 506.

In doing so, the digital TV receiver may further have another output signal for interfacing with an external recorder (e.g., VCR) exiting in the conventional market as well as the monitor output for video information display. As such a signal is occasionally limited to the NTSC or PAL standardization only, the teletext information existing within the original input signal should be bypassed without information loss to be identically used in the external recorder, which is carried out by the teletext bypass unit 503 according to the present invention.

Figure 6:
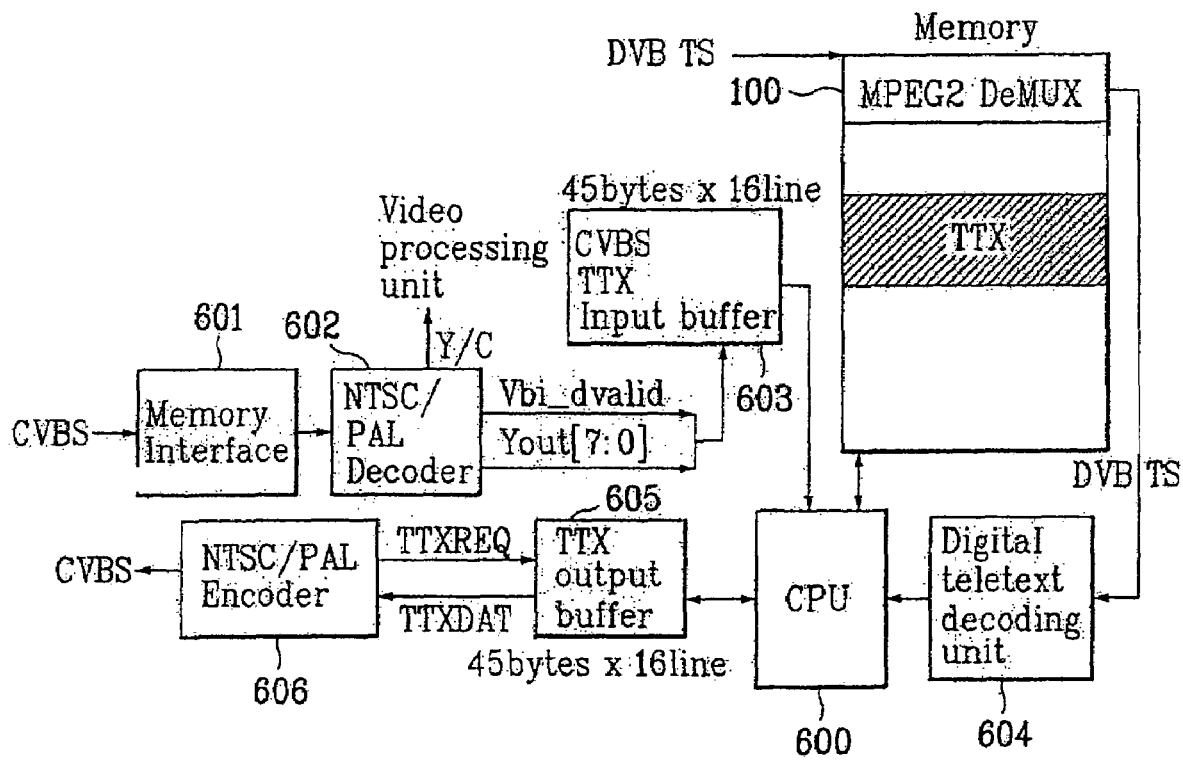
FIG. 6 is a detailed block diagram of a teletext information bypass unit of a digital TV receiver according to one embodiment of the present invention.

FIG. 6 is a detailed block diagram of the teletext bypass unit 503 of a digital TV receiver in FIG. 5 according to one embodiment of the present invention, in which all the elements except an external system memory 100 can be integrated on one-chip together with the elements shown in FIG. 5.

Namely, FIG. 6 shows a structural block diagram of implementing minimized hardware of the teletext bypass unit 503 for making teletext information bypassed to an output signal for an external monitor without distortion.

Referring to FIG. 6, the teletext bypass unit according to the present invention includes a memory interface 601 reading out a digitized CVBS signal stored in an external system memory 100, an NTSC/PAL decoder 602 extracting teletext information from the digitized CVBS signal read out via the memory interface 601, a CVBS TTX input buffer 603 storing the extracted teletext information therein, a central processor unit (CPU) 600 storing the teletext information stored in the CVBS TTX input buffer in the external system memory 100 or reading out the teletext information of an analog or digital video signal stored in the external system memory 100, a digital teletext decoding unit 604 extracting the teletext information from DVB TS stored in the external system memory 100 to store in the external system memory 100, a TTX output buffer 605 temporarily storing the teletext information outputted from the CPU 600, and an NTSC/PAL encoder 606 encoding the teletext information into an NTSC or PAL signal to output.

The above-constructed teletext bypass unit 503 receives an analog video signal (e.g., NTSC or PAL CVBS) or a digital video signal as an input. In FIG. 6, as the teletext is mainly used in Europe, PAL CVBS signal for analog video signal and DVB (digital video broadcasting) signal of European digital TV system for digital video signal are taken as examples for convenience of explanation. Namely, in FIG. 6, the analog video signal becomes PAL CVBS signal and the digital video signal becomes DVB TS stream.

Figure 7:
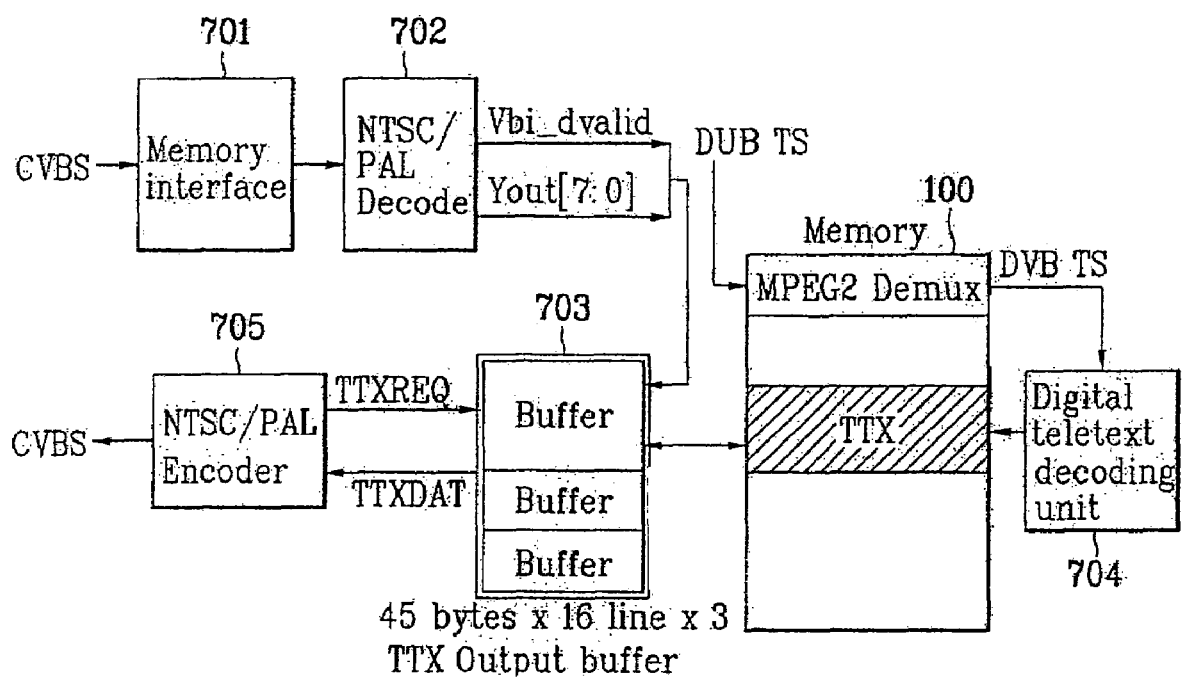
FIG. 7 is a detailed block diagram of a teletext information bypass unit of a digital TV receiver according to another embodiment of the present invention.

In doing so, the output signal for the external monitor enables to carry the teletext information only in case of the NTSC or PAL signal. Namely, in case of a HD or SD component output signal as the digital video signal, there exists no international standardization for carrying teletext signals, whereas it is able to load the teletext information on a composite video signal according to ETSI ETS 300 706, ITU-R BT.653, and EIA-516 in case of the NTSC or PAL signal. Hence, the present invention is characterized in that the teletext information included in the digital video signal, as shown in FIG. 6 or FIG. 7, is carried by the NTSC or PAL signal to be externally outputted.

Referring to FIG. 6, the inputted analog video signal passes an A/D converter (not shown in the drawing), is converted to a digital signal, and is then stored in the external system memory 100 for digital video processing.

The digitized CVBS signal stored in the external system memory 100 is outputted to the NTSC/PAL decoder 602 via the memory interface 601, and the NTSC/PAL decoder 602 converts the digitized CVBS signal to Y/C signal to apply to the video processing unit 501 shown in FIG. 5.

In doing so, teletext signal exists within VBI (vertical blank interval) where video signal among the digitized CVBS signal ails to exists, and the NTSC/PAL decoder 602 performs slicing on teletext data within the CVBS signal to output to the CVBS TTX input buffer 603 for the VBI via a Yout[7:0] output port. Namely, by enabling a signal Vbi_dvalid when the teletext data is outputted, the teletext is outputted as many times as the number of teletext bytes.

The CVBS TTX input buffer 603 is a 1-port memory of 16×45 bytes and enables to store teletext data for one field. Namely, the CVBS TTX input buffer 603 receives signals Vbi_dvalid and Yout[7:0] from the NTSC/PAL decoder 602 a inputs and then detects the teletext data outputted from the Yout[7:0] port to fill it up with one byte each while the signal Vbi_dvalid is enabled. In doing so, once the CVBS TTX input buffer 603 stored the entire teletext data for one field, the CPU 600 reads out the teletext data from the CVBS TTX input buffer 603 to store in an area of the external system memory 100 allocated for the teletext.

Meanwhile, in accordance with the Europe-oriented DVB specifications, teletext signal enables to exist across maximum 16 lines per field and 45-bytes teletext exits on one line. A teletext data volume enabling to exist on one line is 6, 37, 40, 45 bytes according to teletext specifications. Hence, the external system memory 100 of 16×45 bytes is sufficient for storing the entire teletext data existing per one field.

Namely, various streams such as audio stream, private stream, and the like exist in the DVB TS stream as well as video stream. Specifically, the DVB teletext information exists in private stream 1.

In doing so, the DVB TS stream, i.e., the digital TV signal is firstly stored in the area of the external system memory 100 allocated for MPEG-2 demuxing. After the MPEG-2 demuxing has been carried out on the stored DVB TS stream, the video stream is outputted to the video processing unit 501 for video signal processing.

In this case, software sufficiently plays a role in extracting the teletext information existing in the private stream 1, whereby the digital teletext decoding unit 604 in FIG. 6 enables to be implemented by software.

The DVB teletext information extracted by decoding the DVB TS stream in the digital teletext decoding unit 604 is stored in the area within the external system memory 100 allocated for the teletext as well.

In this case, if the inputted signal is for either analog broadcast or digital broadcast, there is no problem of a sequence in storing the teletext information. Yet, in case that at least two inputs for PIP, POP, or double-screens are received to be displayed, it is needed to decide whether the teletext information decoded from the CVBS signal or the other teletext information decoded from the DVB TS stream is stored in the area within the external system memory 100 allocated for teletext area. The present invention decides in accordance with what is outputted to a main screen from a current output signal.

For instance, if the analog CVBS signal is outputted to the main screen from the current output signal of the system and the DVB TS signal is outputted to a sub-screen, the teletext signal carried on the output NTSC or PAL signal will bypass the teletext information existing on the analog CVBS signal. In such a case, the teletext information decoded from the analog CVBS signal should be stored in the teletext area of the external system memory 100.

On the other hand, if the analog CVBS signal is outputted to the sub-screen from the current output signal of the system and the DVB TS signal is outputted to the main screen, the teletext signal carried on the output NTSC or PAL signal will bypass the teletext information existing on the DVB TS stream. In such a case, the teletext information decoded from the DVB TS signal should be stored in the teletext area of the external system memory 100.

In both cases, the teletext information stored in the teletext area of the external system memory 100 for the latest three fields should be entirely stored by considering the synchronization between the input and output signals.

The teletext information stored in the external system memory 100 through the above procedures is stored in the TTX output buffer 605 via the CPU 600. The TTX output buffer 605 then outputs the stored teletext information to the NTSC/PAL encoder 606 if receiving a request from the NTSC/PAL encoder 606 at a rear end. And, the NTSC/PAL encoder 606 encodes the inputted teletext information into analog NTSC or PAL signal to output.

FIG. 7 is a detailed block diagram of a teletext information bypass unit of a digital TV receiver according to another embodiment of the present invention, in which a work used to be done by software in the digital teletext decoding unit in FIG. 6 is performed by hardware if the hardware is sufficiently available.

Referring to FIG. 7, an NTSC/PAL decoder 702 carries out slicing on the digitized analog CVBS signal to extract teletext information and then stores the extracted teletext information in a TTX output buffer 703 directly. Meanwhile, a digital teletext decoding unit 704 constructed with hardware extracts the teletext information from the DVB TS stream stored in the external system memory 100 for a wile and then stores it in the TTX output buffer 703. In doing so, the TTX output buffer 703 should be able to store maximum three fields by considering the synchronization between the input and output signals like the external system memory 100 in FIG. 6.

Subsequently, the TTX output buffer 703 then outputs the stored teletext information to the NTSC/PAL encoder 705 if receiving a request from the NTSC/PAL encoder 705 at a rear end. And, the NTSC/PAL encoder 705 encodes the inputted teletext information into analog NTSC or PAL signal to output.

Moreover, it is also needed to decide whether the teletext information decoded from the CVBS signal or the other teletext information decoded from the DVB TS stream is stored in the TTX output buffer 703. And, it is decided in accordance with what is outputted to a main screen from a current output signal.

FIGS. 8 to 11 are timing diagrams for explaining the operation in FIG. 6 in detail.

FIG. 8 and FIG. 9 are timing diagrams when DVB TS stream as digital TV signal is used for a main picture, in which it is assumed that DVB TS stream is inputted and that teletext information loaded on the DVB TS stream is decoded in the teletext bypass unit 503 including the digital teletext decoding unit constructed with software in FIG. 6.

The digital teletext decoding nit 604, as shown in FIG. 8A or FIG. 9A, decodes the teletext data loaded on the private stream 1 within the DVB TS stream by software (S/W) to store the corresponding decoded data in the teletext area within SDRAM used as the external system memory 100. After the entire teletext data within one field has been written in the external system memory 100, the digital teletext decoding unit 604 changes a DB field information value to inform that the teletext data of a specific field has just been stored in the external system memory 100. Namely, after completion of teletext data decoding of a top field and writing operation of the external system memory 100, the DVB field value is changed into '0' right after the completion like FIG. 8B or FIG. 9B. The DVB filed value '0' is maintained until it is changed into '1' as the same operation is performed on the teletext data of a bottom filed as a next field.

In doing so, the DVB filed value is changed to indicate that the CPU 600 is now able to bring the teletext data of the corresponding field having completed the storage in the external system memory 100 since the entire teletext data of the specific field is stored in the external system memory 100.

Namely, the CPU 600 recognizes the DVB field value and then decides whether to read out the teletext information stored in the external system memory 100 at a certain time point.

Meanwhile, an appropriate teletext data value should be loaded on the VBI of an output composite video (CVBS) signal outputted from the NTSC/PAL encoder 606 since a signal outputted to an external device such as an external recorder is NTSC or PAL type. In doing so, in order to secure a time margin, the CPU 600, as shown in FIG. 8C or FIG. 9C, should read out the appropriate teletext information values from the external system memory 100 and then previously stores them in the TTX output buffer 605 during an interval in which an active video signal of the output CVBS signal is being outputted. The NTSC/PAL encoder 606, as shown in FIG. 8C or FIG. 9C, reads out to load the teletext information prepared in the TTX output buffer 605 on an appropriate line of the VBI coming right after the active video signal output interval.

Namely, at a vertical sync signal (vsync) rising point from which the active video signal starts to be outputted after the VBI of the output CVBS ends, CVBS interrupt, as shown in FIG. 8E or FIG. 9E, takes place.

In this case, the CVBS interrupt signal is set up to occur only if teletext is tuned on. In doing so, a CVBS register TTX_ENBL register (not shown in the drawing) is controlled so that the CVBS interrupt, as shown in FIG. 8D, starts when the bottom goes to the output CVBS field after the teletext data has been detected from the DVB TS stream of the top field to be stored in the external system memory 100. In this case, the CPU 600 is designed to decide the field of the teletext data to be read in the external system memory 100 at the time point that the CVBS interrupt occurs. Namely, in FIG. 8, as the current CVBS field value is '1' at the time point that the CVBS interrupt occurs, the CPU 600 decides that the teletext data of the top field as the next field should be read out of the external system memory 100.

Hence, if the CVBS field value at the moment that the CVBS interrupt, as shown in FIG. 8D, occurs is '1', the teletext information of the top field should be prepared for the next VBI in the TTX output buffer 605 by being read out of the external system memory 100. If the CVBS field value is '0', the teletext information of the bottom field is read out of the external system memory 100 to be prepared for the next VBI in the TTX output buffer 605.

In doing so, the operation of reading the teletext data from the external system memory 100 and storing it in the TTX output buffer 605 should be quickly done for one active video output interval. Thus, after completion of reading out to move the teletext data from the external system memory 100 to the TTX output buffer 605, the teletext data is read out of the TTX output buffer 605 on an appropriate line when the next VBI begins. The teletext data is then is loaded on the CVBS output signal.

When an initial output CVBS interrupt, as shown in FIG. 8E, occurs, the output CVBS field value, as shown in FIG. 8D, is '1'. In this case, the teletext information of the top field should be read out of the external system memory 100. In doing so, the digital teletext decoding unit 604, as shown in FIG. 8B, sets the DVD field to '0' just prior to the corresponding reading, thereby indicating the teletext of the top field is ready to read out the teletext data of the top field. Hence, the teletext information within the DVB TS stream of the top field just written in the external system memory is read in to be stored in the TTX output buffer 605.

The description for FIG. 8 can be identically applied to a flow of loading the teletext information on a location TTX1 of the output CVBS signal in FIG. 9. Namely, when the output CVBS interrupt, as shown in FIG. 9E, initially occurs, the output CVBS field value, as shown in FIG. 9D, is '1'. Accordingly, the teletext information of the top field extracted from the DVB TS should be brought from the external system memory 100. Yet, the DVD filed value, as shown in FIG. 9B, is '1' at this moment as well. Namely, it can be known that the teletext information of the DVB TS prepared just before belongs to the bottom field. Hence, the teletext information corresponding to the top field just prior to the bottom field should be brought from the external system memory 100. In view point of the external system memory, considering such a timing relation, the teletext information of the top filed should be stored as well as the just prepared teletext information used to existing in the DVB TS stream of the bottom field. Thus, as the timing relation between the input and output signals are so various, the teletext information for three fields of the currently prepared input field, the right-before field, and another right-before field should be stored in the teletext area within the external system memory.

FIG. 10 and FIG. 11 are timing diagrams when CVBS as analog TV signal is used for a main picture, which can be almost similarly explained as the description for FIG. 8 and FIG. 9 in case of using DVB TS stream of digital TV signal as a main picture.

Namely, if the analog CVBS input signal passes through the memory interface 601 and the NTSC/PAL decoder 602, the teletext information existing for VBI is sliced to be stored in the TTX input buffer 603.

In this case, since teletext information for one field exists in VBI only, the slicing of the inputted teletext information and the writing in the CVBS TTX input buffer 603 are completed at a time point that vertical synchronization (vsync) of CVBS, as shown in FIG. 10A or FIG. 11A, rises.

Yet, data still exists on the CVBS TTX input buffer 603. Hence, software S/W should move the teletext data to the external system memory 100 from the CVBS TTX input buffer 603 if the input CVBS interrupt, as shown in FIG. 8B, occurs at the vertical sync rising time point of the CVBS after the teletext information has been stored in the CVBS TTX input buffer 603.

Namely, the input CVBS interrupt signal is generated by software via the CPU 100 at the time point of the vertical sync rising of the input CVBS to inform that the writing of the teletext data in the CVBS TTX input buffer 603 has ended. Once the CVBS interrupt signal is generated, the CPU 100 reads out the teletext data from the CVBS TTX input buffer 603 to store in the external system memory 100. The input CVBS field value, as shown in FIG. 8C, is changed the moment the storage of the teletext data in the external system memory 100 is completed.

This is to inform that another block enables to take out the teletext data stored in the external system memory 100.

And, the rest procedures are the same as used in the case of using the DVB TS stream of digital TV signal as a main picture.

Namely, as the output CVBS field value, as shown in FIG. 10E, is '1' at the time point that the initial output CVBS interrupt, as shown in FIG. 10F, occurs, the CPU 100 should read out the teletext information of the top field from the external system memory 100 to store in the TTX output buffer 605. In this case, as the input CVBS filed value is '0', it means that the teletext information of the top field is stored in the external system memory 100 just before. Hence, the CPU 100 reads out the teletext information from the external system memory 100 to store in the TTX output buffer 605 only.

Moreover, as the output CVBS field, as shown in FIG. 11F is '1' at the time point that the initial output CVBS interrupt occurs, the teletext information of the top field should be read out of the external system memory 100. At this time point, the input CVBS field value, as shown in FIG. 11B, is '1'. This means that the teletext information stored in the external system memory 100 just before is that of the bottom field. In such a case, as shown in FIG. 9, the teletext data of the top field, which was stored just before the teletext data of the bottom field is stored, is read out of the external system memory 100 to store in the TTX output buffer 605.

In doing so, a user enables to control on/off operation of loading teletext signal on NTSC/PAL composite signal outputted from the NTSC/PAL encoder 606. And, the teletext signal is executed to be turned on from the top field by taking the output CVBS field as a reference. For this, the operation of moving the teletext information to the TTX output buffer 605 from the external system memory 100 should start from a value of CVBS field reference 1, i.e., bottom field. Hence, an initial field that the output CVBS interrupt starts to occur, as shown in FIG. 10F or FIG. 11F, should begin from the bottom field.

Accordingly, a digital TV receiver for processing teletext information according to the present invention has the following effects or advantages.

First of all, teletext information is detected from the inputted digital TV signal or analog TV signal to be displayed on a screen as intended by a broadcast sender. And, the detected teletext information is bypassed to the output signal for an external monitor without distortion thereof.

Moreover, in IC (integrated circuit) for digital TV video signal processing, teletext signal is detected from the inputted digital TV signal or analog TV signal so that an output signal of the IC is configured to be displayed on a screen as intended by a broadcast sender. And, a circuit for making teletext information bypassed to the output signal for an external monitor without distortion thereof.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A digital TV receiver for processing teletext information, comprising:

a teletext decoder extracting to decode the teletext information from an inputted video signal;

a video processing unit extracting to process a pure video signal from the inputted video signal only;

a teletext bypass unit converting the teletext information extracted from the inputted video signal to an analog video signal form;

a first synthesizing unit synthesizing to output the pure video signal outputted from the video processing unit and the teletext information outputted from the teletext decoder;

a second synthesizing unit synthesizing to output the pure video signal outputted from the video processing unit and the teletext information outputted from the teletext bypass unit; and a memory storing the processed video signal and the teletext information extracted from the inputted video signal.

2. The digital TV receiver of claim 1, wherein the inputted video signal is at least one of an analog video signal and a digital video signal.

3. The digital TV receiver of claim 1, wherein the first and second synthesizing units output synthesized signals to a TV monitor and an external device, respectively.

4. The digital TV receiver of claim 1, wherein if a plurality of video signals are displayed, the memory stores the teletext information decoded from the video signal of a main picture.

5. The digital TV receiver of claim 1, the teletext bypass unit comprising:

a decoder extracting the teletext information from an analog video signal stored in the memory;

an input buffer temporarily storing the extracted teletext information;

a central processor unit storing the teletext information stored in the input buffer in a predetermined area of the memory or reading the teletext information of the analog video signal stored in the memory or the teletext information of a digital video signal stored in the memory;

a digital teletext decoding unit extracting the teletext information from the digital video signal stored in the memory to store in a predetermined area of the memory;

an output buffer temporarily storing the teletext information read from the memory via the central processor unit; and an encoder encoding to output the teletext information stored in the output buffer into the analog video signal form according to a user's request.

6. The digital TV receiver of claim 5, further comprising an analog/digital converting unit converting the inputted analog video signal to a digital signal to store in the memory.

7. The digital TV receiver of claim 5, wherein the decoder carries out slicing on the teletext information existing in VBI 9vertical blank interval) of the analog video signal to output for the VBI.

8. The digital TV receiver of claim 5, wherein if an inputted digital video signal is Europe-oriented DVB transport stream, the digital teletext decoding unit extracts the teletext information from private stream 1 to store in the predetermined area of the memory.

9. The digital TV receiver of claim 5, wherein the digital teletext decoding unit is programmed by software.

10. The digital TV receiver of claim 5, wherein the teletext information extracted from the analog or digital video signal is stored in an area of the memory allocated for teletext.

11. The digital TV receiver of claim 5, wherein the memory stores the teletext information of at least three fields.

12. The digital TV receiver of claim 1, the teletext bypass unit comprising:

a decoder extracting the teletext information from an analog video signal stored in the memory;

an input buffer temporarily storing the extracted teletext information;

a digital teletext decoding unit extracting the teletext information from a digital video signal stored in the memory to temporarily store in a predetermined area of the memory;

an output buffer reading to store the teletext information of the analog video signal from the input buffer or reading to store the teletext information of the digital video signal from the memory; and an encoder encoding to output the teletext information stored in the output buffer into the analog video signal form according to a user's request.

13. The digital TV receiver of claim 12, further comprising an analog/digital converting unit converting the inputted analog video signal to a digital signal to store in the memory.

14. The digital TV receiver of claim 12, wherein the decoder carries out slicing on the teletext information existing in VBI 9vertical blank interval) of the analog video signal to output for the VBI.

15. The digital TV receiver of claim 12, wherein the digital teletext decoding unit is designed by hardware.

16. The digital TV receiver of claim 12, wherein the teletext information extracted from the analog or digital video signal is stored in an area of the memory allocated for teletext.

17. The digital TV receiver of claim 12, wherein the output buffer stores the teletext information of at least three fields.

* * * * *